(12) United States Patent
Furukawa (10) Patent No.: US 7,830,878 B2
(45) Date of Patent: Nov. 9, 2010

(54) VIRTUAL NETWORK CONNECTION SYSTEM, VIRTUAL NETWORK CONNECTION APPARATUS, AND COMPUTER-READABLE MEDIUM

(75) Inventor: Yasuyuki Furukawa, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 216 days.

(21) Appl. No.: 11/924,685

(22) Filed: Oct. 26, 2007

(65) Prior Publication Data

US 2008/0298367 A1    Dec. 4, 2008

(30) Foreign Application Priority Data

May 30, 2007    (JP) .............................. 2007-143068

(51) Int. Cl.
*H04L 12/18* (2006.01)
*H04L 12/56* (2006.01)

(52) U.S. Cl. ...................................... 370/389
(58) Field of Classification Search .................. None
See application file for complete search history.

(56) References Cited

U.S. PATENT DOCUMENTS 7,562,213 B1 *  7/2009  Timms ....................... 713/160

2002/0186698 A1 * 12/2002  Ceniza ....................... 370/401

FOREIGN PATENT DOCUMENTS

| JP | 2000228674 | 8/2000 |
| JP | 2002204252 | 7/2002 |
| JP | 2003169070 | 6/2003 |

* cited by examiner

*Primary Examiner*—Chirag G Shah
*Assistant Examiner*—Minh-Trang Nguyen
(74) *Attorney, Agent, or Firm*—Gauthier & Connors LLP (57) ABSTRACT

There is provided a virtual network connection apparatus including a first storage unit that stores first correspondence information representing a correspondence relationship between a real address of an information processor in a site and a virtual address of the information processor in a virtual network, an address conversion unit that executes an address conversion for transmitted information between an information processor in the site and an information processor outside of the site by referring to the first correspondence information, a second storage unit that stores second correspondence information representing a correspondence relationship between a name of an information processor in the site and a real address of the information processor, a generation unit that generates third correspondence information representing a correspondence relationship between a name of an information processor in the site and a virtual address of the information processor based on the first and the second correspondence information.

6 Claims, 9 Drawing Sheets

|  | CONNECTION AB | CONNECTION AC |
|---|---|---|
| LOCAL-SIDE SELECTOR (OUTBOUND) | 10.0.0.0/24 | 10.0.0.0/24 |
| LOCAL-SIDE SELECTOR (INBOUND) | 20.0.0.0/24 | 20.0.0.0/24 |
| REMOTE-SIDE SELECTOR | 30.0.0.0/24 | 172.16.0.0/24 |
| LOCAL-SIDE PEER | 1.1.0.1 | 1.1.0.1 |
| REMOTE-SIDE PEER | 1.2.0.1 | 1.3.0.1 |

Fig. 3

| OUTBOUND PACKET | SOURCE : 10.0.0.0/24→20.0.0.0/24 |
|---|---|
| INBOUND PACKET | DESTINATION : 20.0.0.0/24→10.0.0.0/24 |

| HOST NAME | IP ADDRESS |
|---|---|
| PC_A1.foo.com | 10.0.0.1 |
| PC_A2.foo.com | 10.0.0.3 |
| ⋮ | ⋮ |

Fig. 6

| HOST NAME | IP ADDRESS |
|---|---|
| PC_A1.foo.com | 20.0.0.1 |
| PC_A2.foo.com | 20.0.0.3 |
| ⋮ | ⋮ |

VIRTUAL NETWORK CONNECTION SYSTEM, VIRTUAL NETWORK CONNECTION APPARATUS, AND COMPUTER-READABLE MEDIUM

CROSS-REFERENCE TO RELATED APPLICATIONS

This application is based on and claims priority under 35 USC 119 from Japanese Patent Application No. 2007-143068 filed on May 30, 2007.

BACKGROUND

1. Technical Field

The present invention relates to a virtual network connection system, a virtual network connection apparatus, and a computer-readable medium.

2. Related Art

Recently, VPN (Virtual Private Network) services have come into wide use. VPN service is a service which enables exclusive communication, similar to that provided by a dedicated line, between a host or a site and another host or site via a public network such as the Internet. When multiple sites are to be connected via a virtual network such as a VPN, a conflict may occur between private addresses used in the sites. In such a case, communication that uses the private address as a source or a destination is not possible.

SUMMARY

According to one aspect of the present invention, there is provided a virtual network connection system having a collection unit that collects, from each of sites in a virtual network, a real address of an information processor in the site; an assignment unit that assigns, to each information processor having an overlapping real address among the real addresses collected by the collection unit, a virtual address which does not overlap with that of the other information processors in the sites; a first generation unit that generates first correspondence information representing a correspondence relationship between a virtual address assigned by the assignment unit and the real address; a first providing unit that generates setting information for a virtual network connection on the basis of the first correspondence information and provides the setting information to a virtual network connection apparatus of each of the sites; an acquisition unit that acquires second correspondence information representing a correspondence relationship between the real address of an information processor and a name of the information processor from the site to which the information processor belongs; a second generation unit that generates third correspondence information representing a correspondence relationship between the virtual address and the name of the information processor on the basis of the first correspondence information and the second correspondence information; and a second providing unit that provides the third correspondence information to the virtual network connection apparatus of each of the sites.

BRIEF DESCRIPTION OF THE DRAWINGS

Exemplary embodiment(s) of the present invention will be described in detail by reference to the following figures, wherein.

DETAILED DESCRIPTION

An example of a network structure of an exemplary embodiment will now be described with reference to FIG. 1. In this example, one VPN (Virtual Private Network) is constructed between LANs (Local Area Network) of three sites A, B, and C.

VPN routers 100A, 100B, and 100C are provided in sites A, B, and C, respectively. The VPN routers 100A, 100B, and 100C are connected to the Internet 300. The VPN routers 100A, 100B, and 100C are also connected to LANs 200A, 200B, and 200C of the sites A, B, and C, respectively. A computer 220A and a master DNS (Domain Name System) 240A are connected to the LAN 200A, and a computer 220B and a master DNS 240B are connected to the LAN 200B. Similarly, a computer and a master DNS are connected to the LAN 200C (not shown). In the illustrated configuration, identical private network addresses of 10.0.0.0/24 are set in the LANs 200A and 200B.

In this example configuration, each of the VPN routers 100A, 100B, and 100C has a router function for IP (Internet Protocol) routing and a VPN connection control function. In the illustrated configuration, global IP addresses 1.1.0.1, 1.2.0.1, and 1.3.0.1 are assigned to VPN interfaces of the VPN routers 100A, 100B, and 100C, respectively, on a side of the Internet 300. In addition, in the illustrated configuration, a private IP address 10.0.0.2 is assigned to an interface of the VPN router 100A on a side of the LAN 200A, and a private address 10.0.0.2 is assigned to an interface of the VPN router 100B on a side of the LAN 200B. Here, a global IP address refers to an IP address which is uniquely assigned on the Internet to a device connected to the Internet. A private IP address, on the other hand, refers to an IP address which is uniquely assigned within an organization to a device connected to a network (for example, a LAN) in the organization. Because the private IP addresses are assigned in each organization, there may be cases in which the private IP addresses of devices in different organizations have the same value. The VPN routes 100A, 100B, and 100C may have a global IP address other than the global IP address for VPN and may use this global IP address for communication other than that via VPN.

Each of the computers 220A and 220B is an information processor such as a personal computer, a workstation, or a server. A private IP address 10.0.0.1 in the LAN 200A is assigned to the computer 220A, and a private IP address 10.0.0.1 in the LAN 200B is assigned to the computer 220B.

The master DNS 240A stores a correspondence relationship between a host name of each computer and an IP address on the LAN 200A. The master DNS 240B stores a correspondence relationship between a host name of each computer and an IP address on the LAN 200B. The IP address of the computer may be a private IP address or a global IP address. When an IP address is dynamically assigned to a computer on the LAN 200A or a computer on the LAN 200B in accordance with DHCP (Dynamic Host Configuration Protocol) or the like, a dynamic DNS may be used as the master DNS 240A or 240B. Although not shown, a master DNS storing a correspondence relationship between a host name of each computer and an IP address on the LAN 200C is provided on the LAN 200C.

When one VPN is to be constructed between three sites A, B, and C, because the computers 220A and 220B have an overlapping private IP address, communication via the VPN between these computers cannot be realized. In consideration of this, in the illustrated configuration, the VPN routers 100A, 100B, and 100C cooperate as one system so that communication via the VPN is enabled even when there are computers with an overlapping IP address in the sites forming a part of the VPN.

More specifically, in this system, routing information held by the VPN routers 100A, 100B, and 100C are collected, to check whether or not there are computers having an overlapping private IP address in the sites A, B, and C. Then, IP addresses which are virtual (or simulated) (hereinafter referred to as "virtual IP address") and which do not overlap among the sites are assigned to the computers having an overlapping IP address so that these computers can participate in the VPN.

When the above-described system automatically assigns the virtual IP address, the computers participating in the VPN cannot communicate via the VPN unless the computers know which virtual IP address is assigned to which computer. Thus, in this system, the virtual IP address which is automatically assigned is reflected in the DNS (Domain Name System) so that the virtual IP address can be resolved from the host name of the computer.

In this system, for example, the VPN router 100A may function as a master, collect routing information from other VPN routers 100B and 100C, and execute an assignment process of the virtual IP address by reference to the collected information. A functional structure of the VPN router 100A functioning as a master will now be described with reference to FIG. 2.

Figure 2:
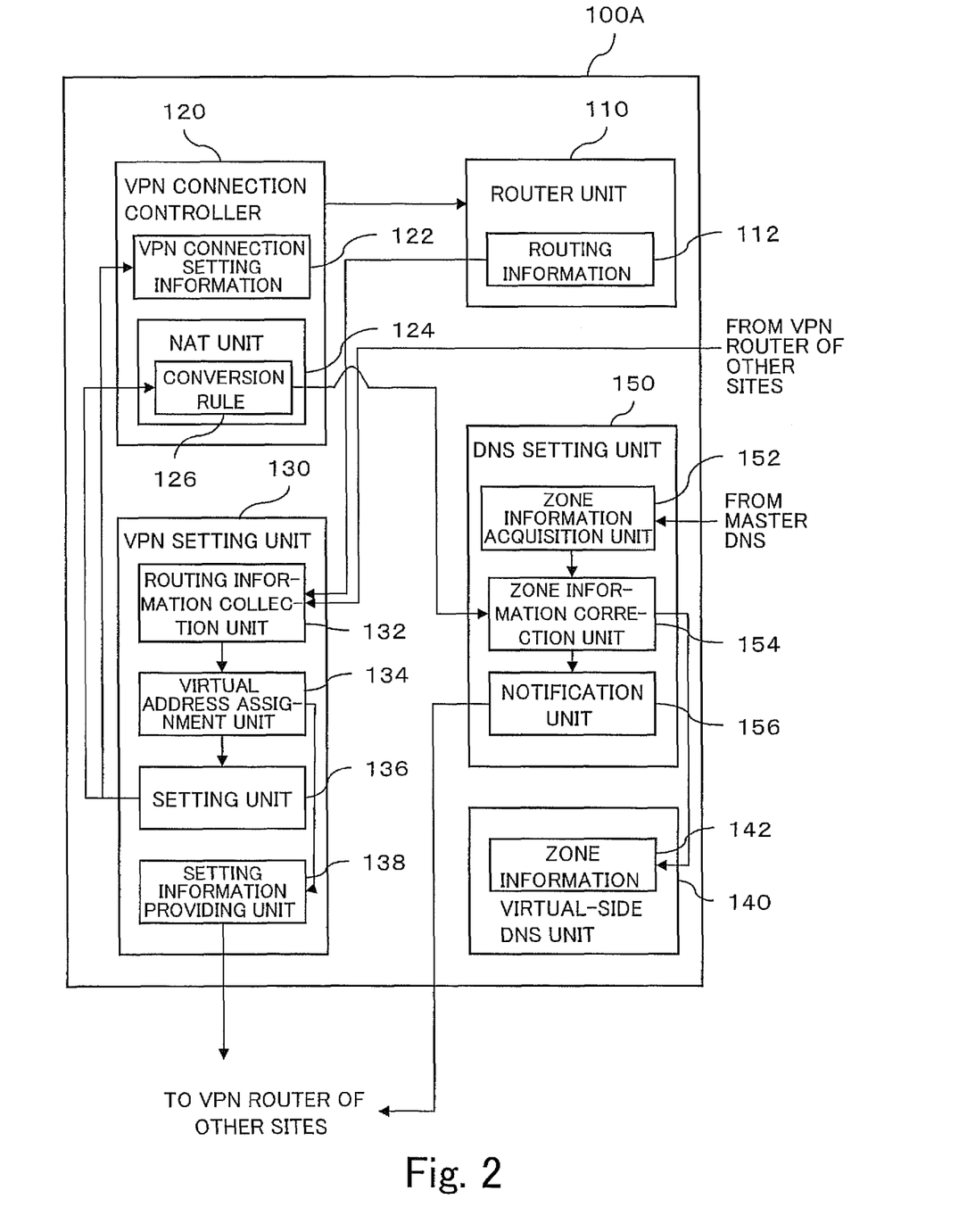
FIG. 2 is a functional block diagram showing an example of a VPN router which operates as a master.

The VPN router 100A has a router unit 110, a VPN connection controller 120, a VPN setting unit 130, a virtual-side DNS unit 140, and a DNS setting unit 150. The router unit 110 performs routing of packets communicated between networks. The router unit 110 refers to routing information 112 for the routing. A router similar to that in well-known techniques can be used as the router unit 110, and routing information similar to that in well-known techniques can be used for the routing information 112.

The VPN connection controller 120 is a function module which executes a process for communication via the VPN. The VPN connection controller 120 executes the VPN communication by means of, for example, IPsec (Internet Protocol Security). The IPsec is merely exemplary, and the VPN connection controller 120 may use other VPN techniques. The VPN connection controller 120 executes the VPN communication by reference to VPN connection setting information 122. The VPN connection setting information 122 may include, for example, information of global IP addresses of the other VPN routers 100B and 100C on the VPN. The VPN connection setting information 122 may also include information of a security policy, for example, which indicates which IP packet is to be communicated via VPN. The security policy may include, for example, information of a combination of a source address and a destination address of IP packets to be communicated via the VPN.

Figure 3:
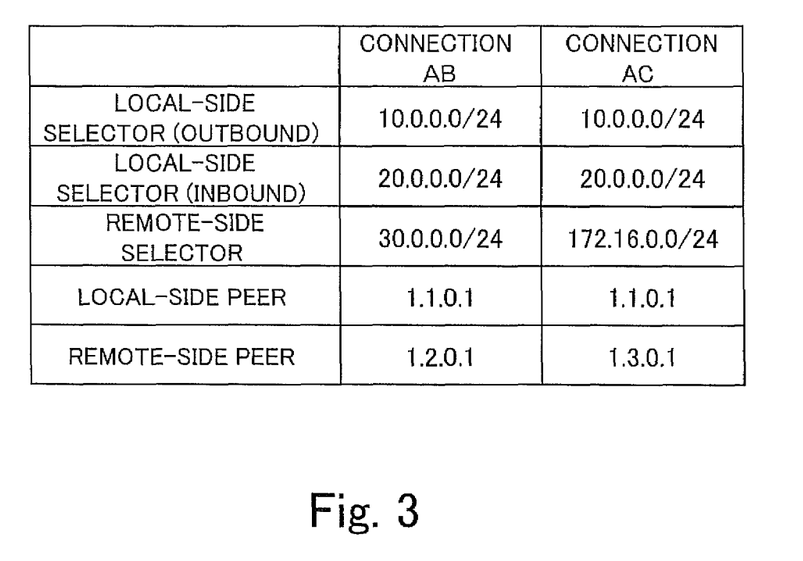
FIG. 3 is a diagram showing an example of VPN connection setting information.

FIG. 3 shows an example of the VPN connection setting information 122. The illustrated example is an example of the VPN connection setting information 122 held by the VPN router 100A for the VPN including sites A, B, and C. From the viewpoint of the VPN router 100A, the VPN in this configuration includes a VPN connection between sites A and B and a VPN connection between sites A and C. The VPN connection setting information 122 includes individual setting information for each of the VPN connections.

In the VPN connection setting information, a pair consisting of a "local-side selector" and a "remote-side selector" indicates a selection condition for selecting a packet via the VPN. The "local-side selector" is a condition related to an address within a site on a local side of the VPN connection seen from the VPN router 100A (that is, within the LAN 200A managed by the VPN router 100A). The "local-side selector" includes a condition for an outbound packet and a condition for an inbound packet. The local-side selector for the outbound packet is a condition related to a source IP address of a packet to be outbound from the LAN to the Internet, and the local-side selector for the inbound packet is a condition related to a destination IP address of a packet which is inbound from the Internet to the LAN. The "remote-side selector" is a condition related to an address in a site of the other party of the VPN connection seen from the VPN router 100A. A "local-side peer" is a global IP address of the interface used by the VPN router 100A for the VPN connection, and a "remote-side peer" is a global IP address of the VPN router 100B or 100C of the other party of the VPN connection.

For example, the setting information for connection AB in FIG. 3 shows (1) a rule that "when 24 upper bits of the source IP address of the packet received from within the LAN 200A match 10.0.0 and 24 upper bits of the destination IP address match 30.0.0, the packet is to be encapsulated and the encapsulated packet is to be transmitted from the address 1.1.0.1 of the VPN router 100A to the address 1.2.0.1 of the VPN router 100B which is the other party" and (2) a rule that "when 24 upper bits of the source IP address of a packet transmitted from 1.2.0.1 (VPN router 100B) to 1.1.0.1 (VPN router 100A) match 20.0.0 and 24 upper bits of the source IP address match 30.0.0, the packet is to be decapsulated and the packet obtained as a result of decapsulation is to be transmitted to a computer on the LAN 200A".

In the VPN connection setting information 122, the "local-side peer" and the "remote-side peer" are fixed values determined by the VPN routers in the VPN, and, for example, may be set by administrators managing the VPN routers 100A, 100B, and 100C. The "local-side selector" and the "remote-side selector," on the other hand, may be a virtual IP address, and, may be automatically set, after assignment of the virtual IP address is determined, in accordance with the assignment. For example, the local-side selector 20.0.0.0/24 is represented with virtual IP addresses.

The items of the VPN connection setting information 122 shown in FIG. 3 are merely exemplary. The VPN connection setting information 122 may additionally include other items such as, for example, a source port number or a destination port number and a protocol to be used. In addition, when the VPN router 100A controls connection of multiple different VPNs, individual setting information as exemplified in FIG. 3 is generated and used for each VPN.

Figure 4:
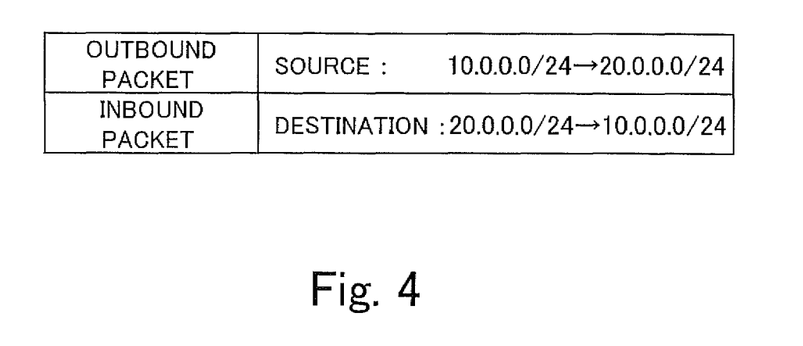
FIG. 4 is a diagram showing an example of a conversion rule in an NAT unit.

The VPN connection controller 120 has an NAT (Network Address Translator) unit 124. The NAT unit 124 refers to a conversion rule 126 and converts between the real IP address (that is, the original private IP address) and the virtual IP address for the source and destination IP addresses. FIG. 4 exemplifies a conversion rule 126 held by the VPN router 100A. The conversion rule shown in FIG. 4 is applied to packets determined by the VPN connection setting information 122 as "packets via VPN". This example rule defines that (1) for an outbound packet exiting from the LAN 200A to the Internet, the source IP address is to be converted from the private IP address 10.0.0.x to virtual IP address 20.0.0.x and that (2) for an inbound packet entering from the Internet to the LAN 200A, the destination IP address is to be converted from the virtual IP address 20.0.0.x to the real address (private IP address) 10.0.0.x. The conversion rule 126 is set after the assignment of the virtual IP address is determined.

When the VPN router 100A controls connections of multiple, different VPNs, the conversion rule as shown in FIG. 4 is generated and used for each VPN.

Even when the source IP address of an outbound packet from the LAN 200A to the Internet is 10.0.0.x, if the destination IP address is that other than the site of the other party of the VPN connection, the conversion rule 126 is not applied. Such a case is in a region of normal NAT or IP masquerade such as, for example, conversion of the source IP address to a global IP address held by the router, and is not directly related to VPN. The VPN routers 100A, 100B, and 100C may have such a normal NAT, NAPT (Network Address Port Translation), or IP masquerade function. The NAPT and IP masquerade are technologies in which one global IP address is shared by multiple computers in a company or the like connected to the Internet. The NAPT is defined in, for example, RFC 2663 "NAT Terminology and Considerations".

The VPN setting unit 130 is a function module which executes a setting process for VPN. The VPN setting unit 130 of the VPN router 100A has a routing information collection unit 132, a virtual address assignment unit 134, a setting unit 136, and a setting information providing unit 138. The route information collection unit 132 collects the routing information 112 from the VPN routers 100A, 100B, and 100C of the sites of the VPN. The routing information 112 held by the VPN router 100A may be acquired from the router unit 110. The global IP addresses of the VPN routers 100B and 100C can be known from the VPN connection setting information 122, and, thus, the routing information collection unit 132 can send requests to these IP addresses for the routing information.

The virtual address assignment unit 134 checks whether or not there is an overlapping private IP address among computers of the sites A, B, and C, by reference to the routing information collected from all VPN routers of the VPN. When an overlapping private IP address is found, the virtual address assignment unit 134 assigns virtual IP addresses which do not overlap within the VPN for the private IP address. Alternatively, it is also possible to employ a configuration in which the virtual IP address is assigned not only to the computer having the private IP address overlapping with another computer in the VPN, but also to a computer having non-overlapping private IP address.

The assignment of the virtual IP address may be executed in units of computers as described above or may be executed in units of LANs. More specifically, in this case, a virtual network address which does not overlap in the sites is assigned to a LAN having overlapping private network addresses among the LANs of the sites of the VPN. Each computer on the LAN is assigned a virtual IP address belonging to the virtual network address. For example, the virtual IP address of a computer may be determined by leaving the host section of the original private IP address of the computer unchanged and replacing the network section with the virtual network address.

Figure 1:
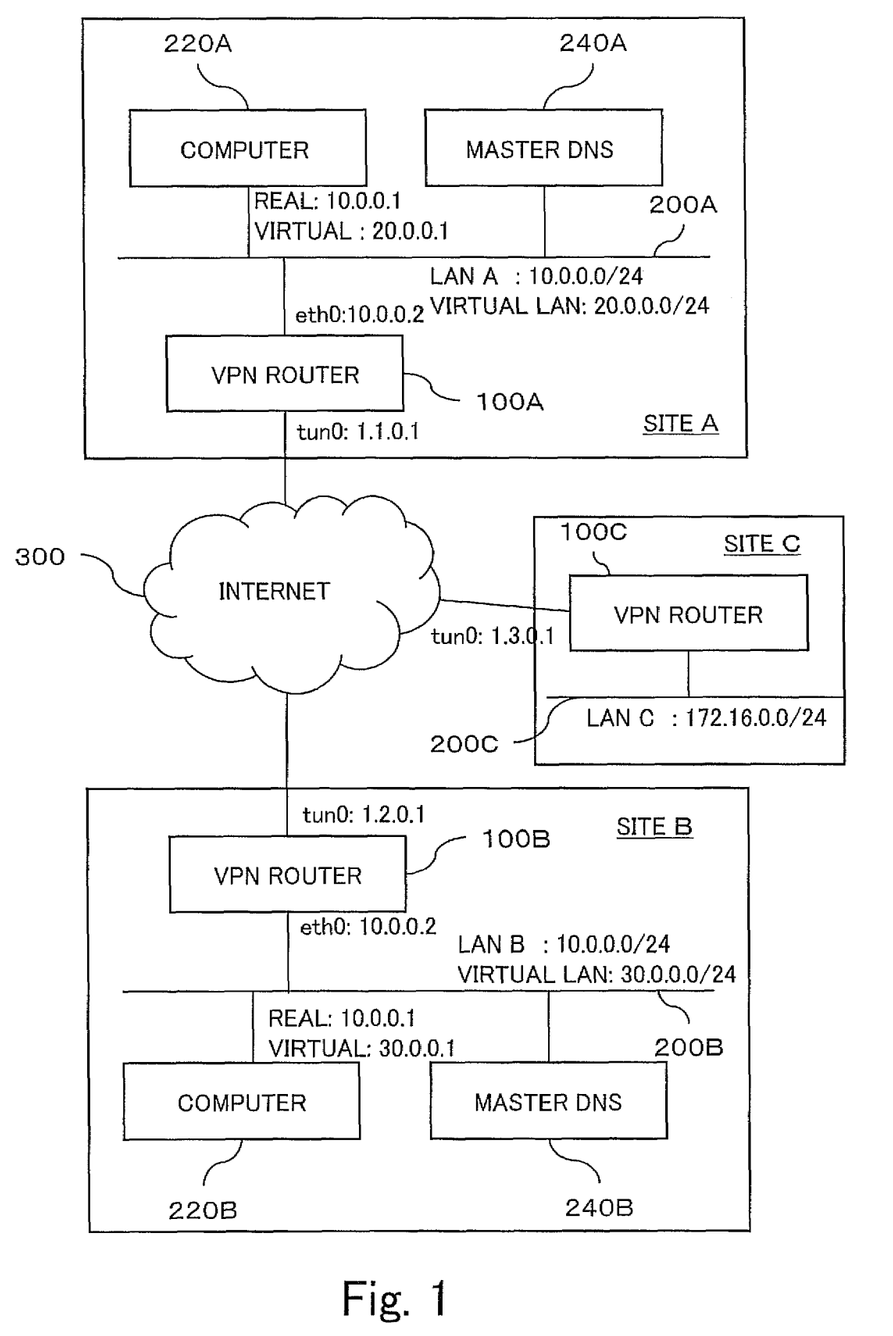
FIG. 1 is a diagram showing an example of a network structure.

In the example configuration of FIG. 1, it is possible to understand, from the routing information collected from sites A, B, and C, that both of the LANs 200A and 200B have network addresses of 10.0.0.0/24 and the LAN 200C has network addresses of 172.16.0.0/24. Because the private network addresses overlap between the LANs 200A and 200B, the virtual address assignment unit 134 assigns, for example, 20.0.0.0/24 as virtual network addresses for the LAN 200A and 30.0.0.0/24 as virtual network addresses for the LAN 200B. On the other hand, because the LAN 200C does not have network addresses which overlap with other LANs in the VPN, the original network addresses are used for the LAN 200C. Alternatively, it is also possible to employ a configuration in which virtual network addresses which do not overlap with other LANs in the VPN are assigned to the LAN 200C.

In the exemplified system, as the IP address of the computer in the LAN, the private IP address is used within the LAN and the virtual IP address is used outside of the LAN. For example, in the exemplified configuration of FIG. 1, a source address of a packet transmitted from the computer 220A of the site A to the computer 220B of the site B is 10.0.0.1 in the site A, but is replaced with 20.0.0.1 by the VPN router 101A when the packet is sent to the Internet 300.

The virtual address assignment unit 134 may assign the virtual IP address or the virtual network address from a range reserved as private IP addresses. In the example configuration of FIG. 1, however, in order to avoid complexity of the drawing, a relatively simple address outside of a range of the private IP address is used as the virtual IP address.

The setting unit 136 sets the VPN connection setting information 122 and the conversion rule 124 by reference to the assignment result by the virtual address assignment unit 134. For example, in the example configuration of FIG. 1, as a result of assignment of the virtual network addresses 20.0.0.0/24 to the site A (having private network addresses 10.0.0.0/24) to which the VPN router 100A belongs, the setting unit 136 sets the rules exemplified in FIG. 4 as the conversion rule 126. In addition, the setting unit 136 sets 20.0.0.0/24 as the local-side selector for the inbound packet in the VPN connection setting information 122 (for the outbound packet, the private network address can be set). As a result of assignment of the virtual network addresses 30.0.0.0/24 for the LAN 200B to which the VPN router 100B having the global IP address of 1.2.0.1 belongs, the setting unit 136 sets the remote-side selector for the connection AB in the VPN connection setting information 122 to 30.0.0.0/24. In addition, because no virtual network address is assigned to the site C, the private network address 172.16.0.0/24 of the LAN 200C may be set for the remote-side selector for the connection AC in the VPN connection setting information 122.

The setting information providing unit 138 generates setting information for the VPN routers 100B and 100C in the other sites of the VPN by reference to the assignment result by the virtual address assignment unit 134, and provides the setting information to the routers 100B and 100C.

Setting information for a certain VPN router includes information of a correspondence relationship between global IP addresses for the VPN of the other VPN routers on the same VPN and the IP addresses in the VPN of the computers on the LANs to which the routers belong. The IP address in the VPN of the computer is the virtual IP address when the virtual IP address for the VPN is assigned to the computer. When the original private IP address of the computer does not overlap within the VPN, the private IP address may be used as the address in the VPN. In this case, the information of the correspondence relationship includes the private IP address. Alternatively, it is also possible to include the network address in the VPN of the LAN in the information of correspondence relationship in place of the IP addresses in the VPN of the individual computers on the LAN.

For example, the setting information for the VPN router 100B includes the above-described information of correspondence relationship for each of the VPN routers 100A and 100C. The information of the correspondence relationship for the VPN router 100A may include, for example, the global IP address 1.1.0.1 of the VPN router 100A and the virtual network addresses 20.0.0.0/24 of the LAN 200A (or virtual IP addresses of computers and routers in the LAN 200A). Because there is no private network address in the VPN which overlaps the private network address of the LAN 200C, the private network address of the LAN 200C may be used in the VPN. When the private network addresses are to be used also in the VPN, the information of the correspondence relationship for the VPN router 100C may include the global IP address 1.3.0.1 and the private network addresses 172.16.0.0/24 of the LAN 200C (or private IP addresses of the computers or the like in the LAN 200C).

When the VPN routers 100B and 100C receive the setting information from the VPN router 100A which is the master, each of the VPN routers 100B and 100C sets the remote-side selector in the VPN connection setting information 122 on the basis of the above-described information of the correspondence relationship included in the setting information. For example, based on the received information of the correspondence relationship, the VPN router 100B sets, for the remote-side selector for connection with the site A, virtual network addresses 20.0.0.0/24 corresponding to the remote-side peer 1.1.0.1 of the site A and sets, for the remote-side selector for connection with the site C, the network addresses 172.16.0.0/24 corresponding to the remote-side peer 1.3.0.1 of the site C. Such acquisition of the setting information is executed by an information acquisition unit 164 of each of the VPN routers 100B and 100C and the setting of the VPN connection setting information 122 based on the received setting information is executed by the setting unit 136a (refer to FIG. 5).

The setting information provided by the setting information providing unit 138 to the VPN router 100B also includes information of a correspondence relationship between the original private IP addresses (real IP addresses) of the computers on the LAN 200B to which the VPN router 100B belongs and the virtual IP addresses assigned to these computers. Alternatively, it is also possible to employ a configuration in which information of a correspondence relationship between the private network address of the LAN 200B (real network address) and the virtual network address is included in the setting information in place of the information of the correspondence relationship between the real IP addresses and virtual IP addresses of the computers. When the VPN router 100B receives the setting information, the VPN router 100B sets the "local-side selector (inbound)" for the connection with the site A in the VPN connection setting information 122 to, for example, virtual network addresses 30.0.0.0/24 based on the received setting information. The VPN router 100B also sets, as the conversion rule 126 for the VPN, a rule for an outbound packet to convert the source address from the private addresses 10.0.0.0/24 to the virtual addresses 30.0.0.0/24 and a rule for an inbound packet to convert the destination address from the virtual addresses 30.0.0.0/24 to the private addresses 10.0.0.0/24 in the NAT unit 124 on the basis of the received information. These processes are executed by the information acquisition unit 164 and the setting unit 136a in the VPN router 100B.

When the original private addresses are to be used as the addresses for VPN for the LAN 200C, no virtual address is assigned, and, thus, the setting information provided to the VPN router 100C may not include the correspondence information of the real address and the virtual address. The value of the "local-side selector (inbound)" in the VPN connection setting information 122 of the VPN router 100C is set to 172.16.0.0/24, similar to the value of the "local-side selector (outbound)", and the conversion rule 126 may be emptied (that is, no address conversion is executed for the VPN).

With reference again to FIG. 2, in response to a name resolution request from the VPN side, the virtual-side DNS unit 140 of the VPN router 100A responds with an IP address in the VPN of the computer in the LAN 200A corresponding to the name (host name). For this process, the virtual-side DNS unit 140 refers to zone information 142. The zone information 142 includes information, for each computer on the LAN 200A, of a correspondence relationship between the host name and the IP address in the VPN. After the assignment of the virtual IP address by the VPN setting unit 130, the IP address in the VPN included in the zone information 142 is determined. Therefore, the zone information 142 is generated or updated in accordance with a process performed by the VPN setting unit 130. The generation or the update is executed by the DNS setting unit 150.

Although not shown, the VPN router 100A may have a LAN-side DNS for responding to the name resolution request from the computers on the LAN 200A. Alternatively, it is also possible to employ a configuration in which the master DNS 240A is set as the LAN-side DNS in place of providing the LAN-side DNS in the VPN router 100A.

The DNS setting unit 150 has a zone information acquisition unit 152, a zone information correction unit 154, and a notification unit 156. The zone information acquisition unit 152 of the VPN router 100A acquires zone information from the master DNS 240A on the LAN 200A. As described above, the zone information includes information of correspondence relationship between the host names and the real IP addresses of the computers on the LAN 200A. The zone information correction unit 154 generates zone information 142 for VPN on the basis of the zone information acquired by the zone information acquisition unit 152 and the conversion rule 126. For example, because the zone information correction unit 154 of the VPN router 100A can understand, by reference to the conversion rule 126, that the private addresses 10.0.0.0/24 on the LAN 200A are to be converted to the virtual addresses 20.0.0.0/24 in the VPN, the zone information correction unit 154 generates the zone information 142 by replacing the 24 upper bits of the private address 10.0.0.x of the computer in the zone information acquired from the master DNS 240A with 20.0.0.

Figure 6:
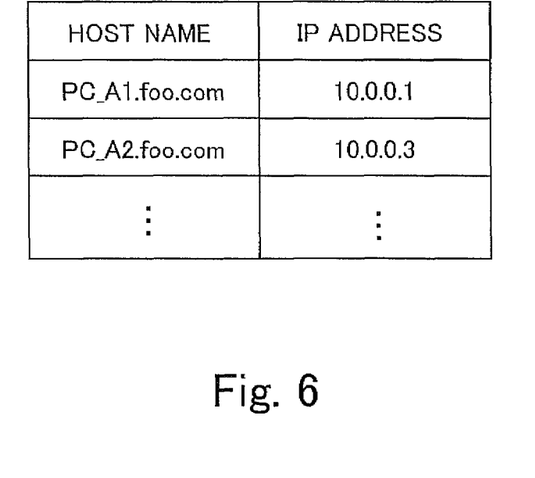
FIG. 6 is a diagram showing an example of zone information of a master DNS.
Figure 7:
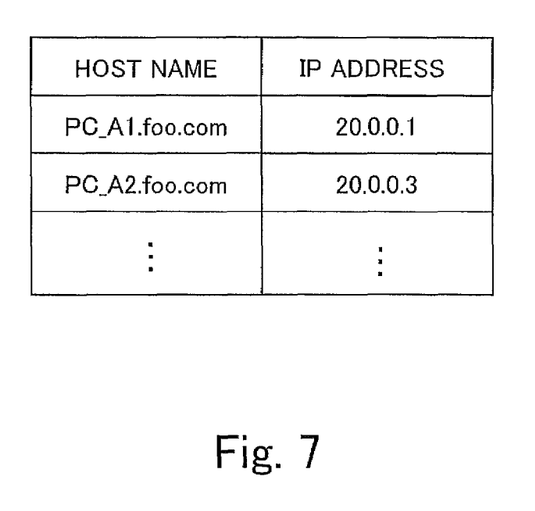
FIG. 7 is a diagram showing an example of zone information of a virtual-side DNS unit which is generated on the basis of the zone information of FIG. 6.

FIG. 6 shows an example of zone information held by the master DNS 240A in the example configuration of FIG. 1. In this example configuration, the domain name of the site A is "foo.com", the host name of the computer 220A is "PC_A1.foo.com", and the private IP address of the computer 220A is 10.0.0.1. The zone information 142 having a content as shown in FIG. 7 is generated by reference to the zone information and the conversion rule shown in FIG. 4. In the example configuration of FIG. 7, a virtual IP address belonging to 20.0.0.0/24 is registered as the IP address of each computer in the zone information 142.

The notification unit 156 of the VPN router 100A notifies, as information for setting forwarding of a name resolution request, to the other VPN routers 100B and 100C in the VPN, a pair consisting of the domain name of the site A and the global IP address for VPN 1.1.0.1 of the VPN router 100A. Upon receipt of the notification, the VPN routers 100B and 100C set the LAN-side DNS for the LAN 200B or 200C by reference to the received information so that a name resolution request for a host name including the domain name of the site A is forwarded to the global IP address 1.1.0.1 of the VPN interface of the VPN router 100A. With this structure, for example, when a name resolution request for the host name of the computer 220A is sent from the computer 220B, the LAN-side DNS for the LAN 200B forwards the request to the global IP address for VPN of the VPN router 100A. Upon receipt of the name resolution request at the global IP address for VPN, the VPN router 100A instructs the virtual-side DNS unit 140 to determine an IP address corresponding to the name resolution request, and returns the IP address to the LAN-side DNS of the LAN 200B. The LAN-side DNS sends the IP address to the computer 220B as a response to the request.

Figure 5:
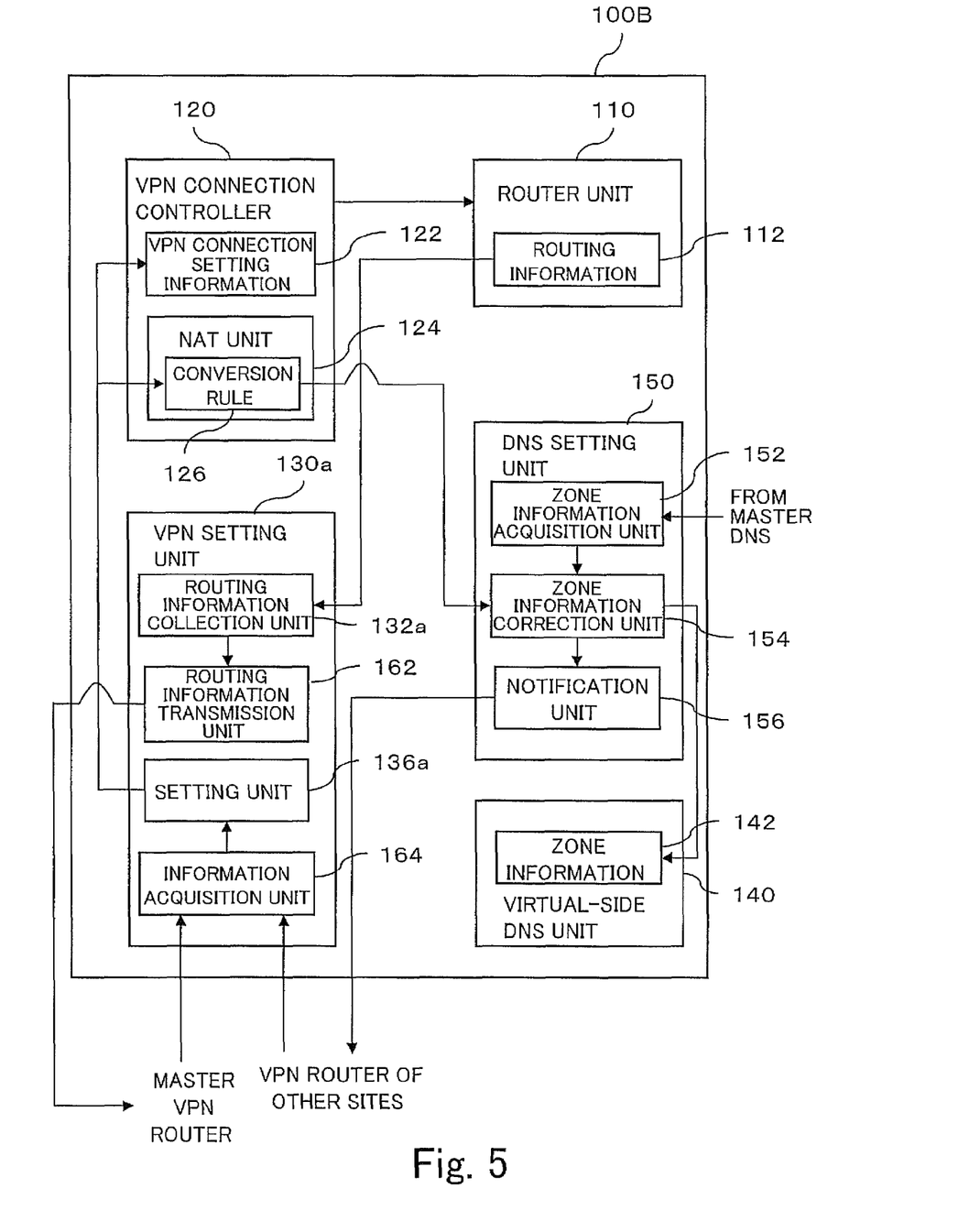
FIG. 5 is a functional block diagram showing an example of a VPN router which is not a master.

Next, a structure of a VPN router 100B which is not a master will be described with reference to FIG. 5. The VPN router 100C has a structure similar to that of the VPN router 100B. In FIG. 5, elements corresponding to those shown in FIG. 2 are assigned corresponding reference numerals and their repeated descriptions are omitted.

The VPN router 100B differs from the master VPN router 100A in the VPN setting unit 130a. A routing information collection unit 132a of the VPN setting unit 130a collects routing information of the router unit 110 in the VPN router 100B in accordance with an instruction from the master VPN router 100A. The collected routing information is transmitted to the VPN router 100A by a routing information transmission unit 162. An information acquisition unit 164 acquires from the master VPN router 100A setting information of the VPN connection setting information and setting information for the conversion rule. On the basis of the setting information, the setting unit 136a sets the VPN connection setting information 122 and the conversion rule 126 as described above. In addition, the information acquisition unit 164 acquires information for setting forwarding of a name resolution request from the notification unit 156 of the other VPN routers 100A and 100C in the VPN. By reference to the information, the setting unit 136a sets the forward setting in the LAN-side DNS.

With cooperative operation of the VPN routers 100A, 100B, and 100C, the virtual IP addresses can be resolved from the host names of computers even when virtual IP addresses are assigned to the computers on the LANs 200A, 200B, and 200C.

Figure 8:
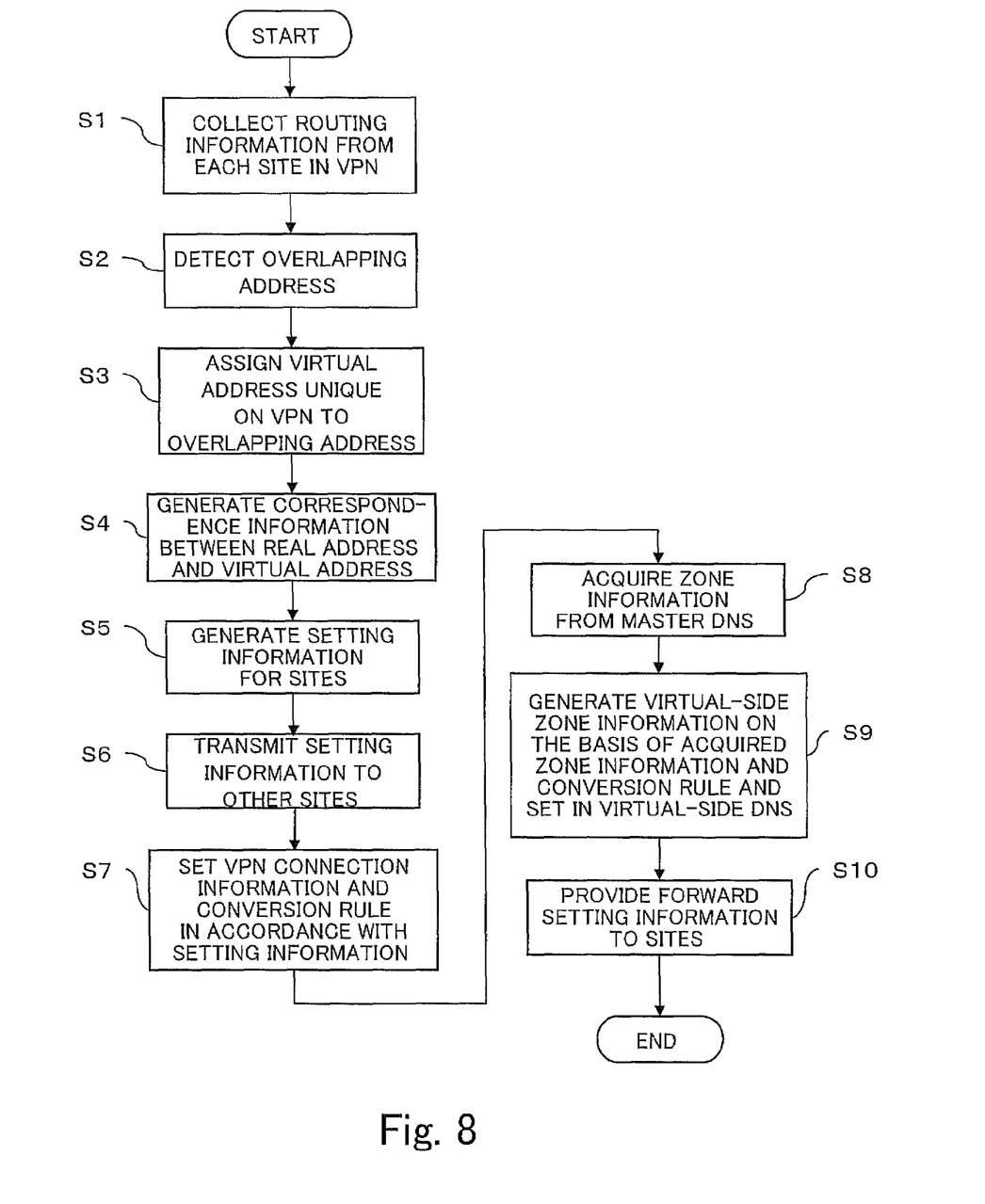
FIG. 8 is a flowchart showing a process of VPN setting for a VPN router which operates as a master.

Next, a process for VPN setting in the master VPN router 100A will be described with reference to FIG. 8. The process is executed, for example, when the administrator instructs the VPN router 100A to start the VPN setting.

In this process, first, the routing information collection unit 132 of the VPN router 100A collects routing information 112 from the router unit 110 and other VPN routers 100B and 100C (S1). Because the global IP addresses for VPN of the other VPN routers 100B and 100C are registered in advance, for example, as the remote-side peer information of the VPN connection setting information 122, inquiries can be sent to the routers 100B and 100C by reference to this information.

Next, on the basis of the collected routing information, the virtual address assignment unit 134 detects private addresses which match others among the private addresses of the LANs or computers of the sites A, B, and C (S2), and assigns, to the LANs or computers having the overlapping private addresses, virtual IP addresses which do not overlap others within the VPN (S3). Alternatively, in this process, it is also possible to employ a configuration in which, regardless of whether or not the addresses overlap, all LANs and computers in the VPN are assigned virtual addresses which are unique in the VPN. The virtual address assignment unit 134 generates information of a correspondence relationship between the assigned virtual address and the original private address for the LANs or computers to which virtual addresses are assigned (S4). Then, by reference to the information of the correspondence relationship, the setting unit 136 generates setting information for each of the VPN routers 100A, 100B, and 100C (S5). As described above, the setting information generated in this process is used for setting of the VPN connection setting information 122 and the conversion rule 126. The setting information providing unit 138 transmits corresponding setting information to the VPN routers 100B and 100C (S6) and sets the VPN connection setting information 122 and the conversion rule 126 in accordance with the setting information for the VPN router 100A itself (S7).

Next, the zone information acquisition unit 152 acquires zone information from the master DNS 240A (S8), generates the zone information 142 by reference to the zone information and the conversion rule 126 which is set in step S7 in a manner described above, and sets the zone information 142 in the virtual-side DNS unit 140 (S9). In addition, the notification unit 156 transmits information for setting forwarding of the name resolution request to the VPN routers 100B and 100C (S10).

Figure 9:
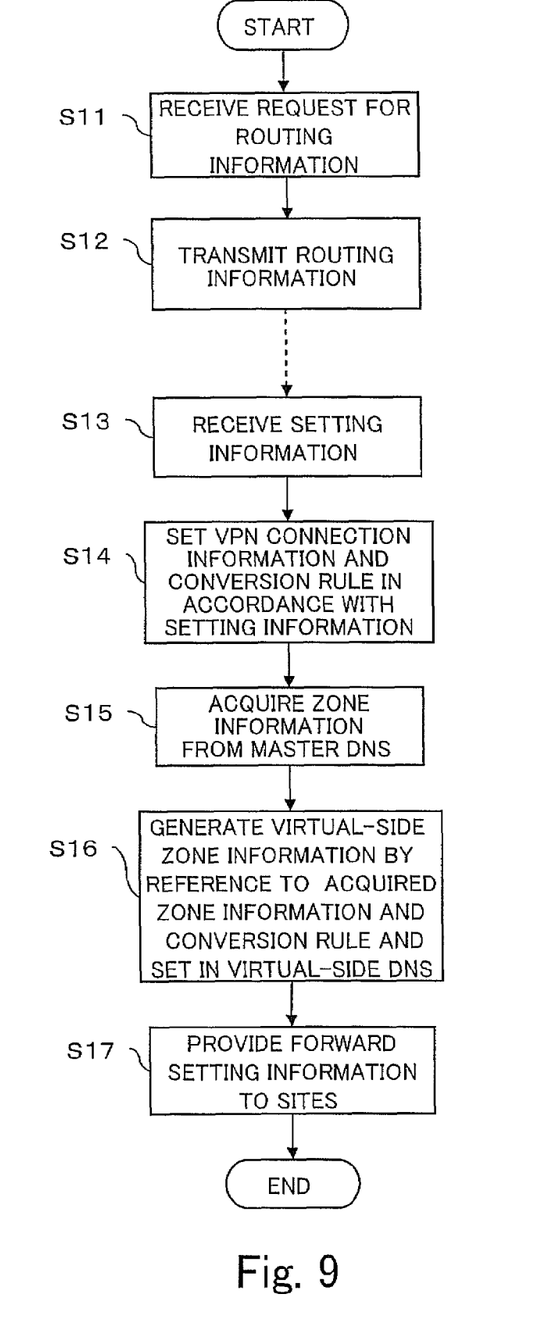
FIG. 9 is a flowchart showing a process of VPN setting for a VPN router which is not a master.

Next, a process performed in the VPN router 100B which is not the master will be described with reference to FIG. 9. The process executed by the VPN router 100C is similar to that of the VPN router 100B.

This process starts when the VPN router 100B receives a request for routing information from the VPN router 100A (S1). Upon receipt of the request, the routing information collection unit 132a collects routing information of the router unit 110, and the routing information transmission unit 162 transmits the routing information to the VPN router 100A (S12). Then, when the information acquisition unit 164 receives setting information for VPN connection setting from the VPN router 100A (S13), the setting unit 136a sets the VPN connection setting information 122 and the conversion rule 126 in accordance with the setting information as described above (S14). The zone information acquisition unit 152 acquires zone information from the master DNS 240B (S15), generates zone information 142 by reference to the zone information and the conversion rule 126 which is set in step S14 in a manner described above, and sets the zone information 142 in the virtual-side DNS unit 140 (S16). The notification unit 156 transmits to the VPN routers 100A and 100C information for setting forwarding of the name resolution request (S17).

With the above-described process, communication via the VPN is enabled. Next, a flow of communication via the VPN will be described with reference to FIG. 10. Here, an example configuration is described in which communication via the VPN is executed between the computers 220A and 220B in an example network structure as shown in FIG. 1. In this example configuration, the computer 220A has already acquired the virtual IP address of the computer 220B by inquiring the LAN-side DNS in the LAN 200A.

Figure 10:
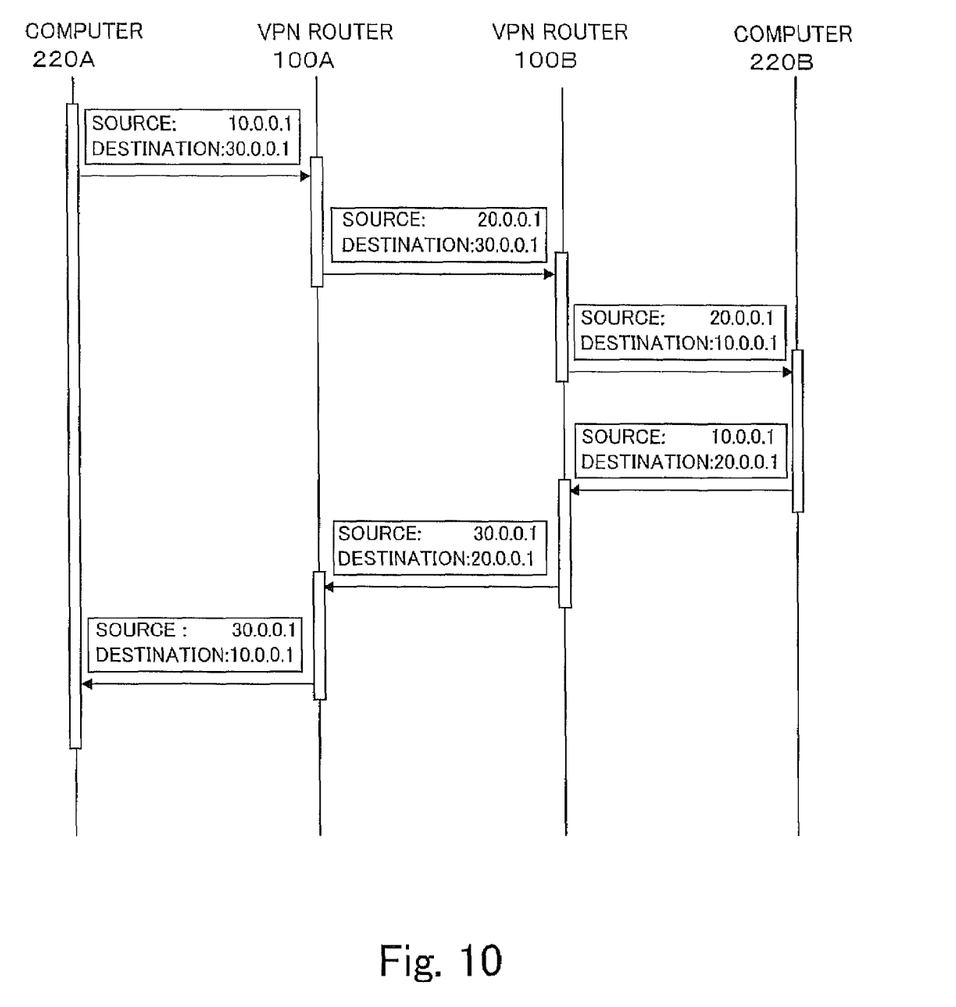
FIG. 10 is a diagram showing an example flow of a VPN communication.

In this flow, first, the computer 220A sends out an IP packet destined for the computer 220B. A source address in an IP header of the packet is the private address 10.0.0.1 of the computer 220A, and a destination address of the IP header of the packet is the virtual address 30.0.0.1 of the computer 220B. The VPN router 100A determines that the pair consisting of the source and the destination of the packet matches the pair consisting of local-side selector (outbound) and the remote-side selector of the VPN connection setting information 122 (refer to FIG. 3). In response to this determination, the VPN router 100A replaces the source address of the packet to the virtual address 20.0.0.1 in accordance with the conversion rule 126 (refer to FIG. 4). The VPN router 100A encapsulates the packet in accordance with a VPN method such as IPsec, and transmits the encapsulated packet to the VPN router 100B tunneling through the Internet 300. Upon receipt of the encapsulated packet, the VPN router 100B decapsulates the capsule, and determines that the source and destination of the original packet obtained as a result of the decapsulation match a pair consisting of the local-side selector (inbound) and the remote-side selector of the VPN connection setting information 122 of the VPN router 100B. In response to this determination, the VPN router 100B converts the destination address of the packet to 10.0.0.1 in accordance with the conversion rule 126, and sends the packet to the LAN 200B. As a result, the computer 220B receives the packet. A return packet from the computer 220B to the computer 220A is processed in a manner opposite of that described above.

In the above-described configuration, the virtual IP address is resolved from the host name and the communication via VPN is realized by cooperative operation of the VPN routers 100A, 100B, and 100C without implementing a special protocol in computers of each site.

In the above-described configuration, the VPN router 100A generates the zone information 142 for determining the virtual address of a computer in the site A, and, upon receiving a name resolution request for a computer in the site A, the VPN router 100B or 100C forwards the request to the VPN router 100A. This configuration, however, is merely exemplary, and, alternatively, it is also possible to employ a configuration in which the VPN router 100A generates the zone information 142 and transmits the zone information 142 to the VPN routers 100B and 100C, and each of the VPN routers 100B and 100C sets the zone information 142 in the LAN-side DNS of the corresponding LAN 200B or 200C. In this case, the VPN router 100A needs not have the virtual-side DNS 140.

In the above-described configuration, the VPN router has functions of the router unit 110, the VPN connection controller 120, and the virtual-side DNS unit 140. However, this is merely exemplary, and the function modules may be implemented by separate hardware devices on the LAN.

In addition, although in the above description, a VPN having 3 sites is described, a person with ordinary skill in the art would understand that the above-described configuration can be applied to a general VPN having two or more sites.

Moreover, in the above-described configuration, one of the VPN routers forming a part of the VPN is set as a master, and the master collects the routing information from other VPN routers, assigns a virtual address, and provides to the other VPN routers setting information generated on the basis of the assignment result. This configuration, however, is merely exemplary. Alternatively, it is also possible to employ a configuration in which a master management apparatus having the master function; that is, functions of the routing information collection unit 132, the virtual address assignment unit 134, and the setting information providing unit 138, is provided on the Internet 300. In this case, each VPN router forming a part of the VPN may have a function similar to that of the VPN router 100B (refer to FIG. 5) which is not the master.

Figure 11:
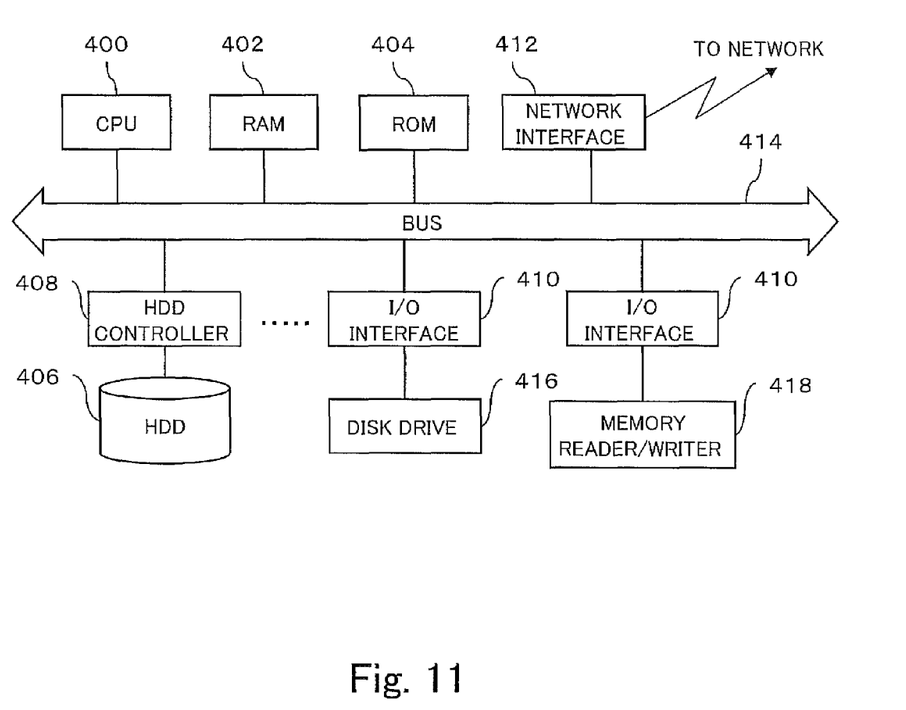
FIG. 11 is a diagram showing an example hardware configuration of a computer.

The VPN routers 100A, 100B, and 100C of the above-described exemplary embodiment may be realized by, for example, executing a program describing the processes of the function modules on a general-purpose computer. As shown in FIG. 11, the computer may have, as hardware, a circuit structure in which various hardware elements are connected via a bus 414; for example, a microprocessor such as a CPU 400, a memory (primary storage) such as a random access memory (RAM) 402 and a read-only memory (ROM) 404, an HDD controller 408 which controls an HDD (Hard Disk Drive) 406, various I/O (input/output) interfaces 410, and a network interface 412 which controls connection with a network such as the local area network etc. A disk drive 416 for reading from and/or writing to a transportable disk recording medium such as a CD or a DVD, or a memory reader/writer 418 for reading from and/or writing to transportable nonvolatile recording media of various standards such as a flash memory may be connected, for example, through the I/O interface 410 to the bus 414.

A program describing processes of the above-described function modules is stored in a non-transitory computer readable medium or a fixed storage device such as the hard disk drive through a recording medium such as a CD or DVD or through a communication unit such as a network and is installed in the VPN router 100. The above-described function modules are realized by the program stored in the fixed storage device read into the RAM 402 and executed by the microprocessor such as the CPU 400. A part or all of the function modules may be constructed as a hardware circuit such as a dedicated LSI (Large Scale Integration), an ASIC (Application Specific Integrated Circuit), or FPGA (Field Programmable Gate Array).

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. A virtual network connection system comprising:
   a collection unit that collects, from each of sites in a virtual network, a real address of an information processor in the site;
   an assignment unit that assigns, to each information processor, having an overlapping real address among the real addresses collected by the collection unit, a virtual address, which does not overlap with that of the other information processors in the sites;
   a first generation unit that generates first correspondence information representing a correspondence relationship between a virtual address assigned by the assignment unit and the real address;
   a first providing unit that generates setting information for a virtual network connection on the basis of the first correspondence information and provides the setting information to a virtual network connection apparatus of each of the sites;

an acquisition unit that acquires second correspondence information representing a correspondence relationship between the real address of an information processor and a name of the information processor site to which the information processor belongs;

a second generation unit that generates third correspondence information representing a correspondence relationship between the virtual address and the name of the information processor on the basis of the first correspondence information and the second correspondence information; and a second providing unit that provides the third correspondence information to the virtual network connection apparatus of each of the sites;

said second providing unit including a reception unit that receives, via the virtual network from a first device, a name resolution request for requesting resolution of an address corresponding to a name of a second device; and a transmission unit that identifies, in response to the name resolution request received by the reception unit, a virtual address corresponding to the name of the second device by reference to the third correspondence information, and transmits the identified virtual address to the first device.

2. A virtual network connection apparatus comprising:

a first storage unit that stores first correspondence information representing a correspondence relationship between a real address of an information processor in a site and a virtual address of the information processor in a virtual network;

an address conversion unit that executes an address conversion for transmitted information between an information processor in the site and an information processor outside of the site by referring to the first correspondence information;

a second storage unit that stores second correspondence information representing a correspondence relationship between a name of an information processor in the site and a real address of the information processor;

a generation unit that generates third correspondence information representing a correspondence relationship between a name of an information processor in the site and a virtual address of the information processor on the basis of the first correspondence information and the second correspondence information; and a providing unit that provides the third correspondence information to other sites in the virtual network;

said providing unit including a reception unit that receives, via the virtual network from a first information processor outside of the site, a name resolution request for requesting resolution of an address corresponding to a name of a second information processor in the site; and a transmission unit that identifies, in response to the name resolution request received by the reception unit, a virtual address corresponding to the name of the second information processor on the basis of the third correspondence information, and transmits the identified virtual address to the first information processor.

3. The virtual network connection apparatus according to claim 2, wherein the providing unit further comprises:

a notification unit that notifies other sites of forward setting information including a domain name of the site and a global IP address of the virtual network connection apparatus;

a forward setting storage unit that receives, from other sites, forward setting information including a domain name of the other site and a global IP address of a virtual network connection apparatus of the other site, and stores the forward setting information;

a forwarding unit that, when a domain name in a name included in a name resolution request from a third information processor in the site includes a domain name of another site included in the forward setting information stored in the forward setting storage unit, forwards the name resolution request to a global IP address of the virtual network connection apparatus of the other site included in the forward setting information; and a response unit that sends to the third information processor a virtual address returned from a virtual network connection apparatus of the other site in response to a name resolution request forwarded by the forwarding unit.

4. A non-transitory computer-readable medium storing a program causing a computer to execute a process for virtual network connection, the process comprising:

collecting, from each of sites in a virtual network, a real address of an information processor in the site;

assigning, to an information processor having an overlapping real address among the collected real addresses, a virtual address which does not overlap with that of other information processors in the sites;

generating first correspondence information representing a correspondence relationship between the assigned virtual address and the real address;

generating setting information for a virtual network connection on the basis of the first correspondence information and provides the setting information to a virtual network connection apparatus of each of the sites;

acquiring second correspondence information representing a correspondence relationship between the real address of an information processor and a name of the information processor site to which the information processor belongs;

generating third correspondence information representing a correspondence relationship between the virtual address and the name of the information processor on the basis of the first correspondence information and the second correspondence information; and providing the third correspondence information to the virtual network connection apparatus of each of the sites by receiving, via the virtual network from a first device, a name resolution request for requesting resolution of an address corresponding to a name of a second device and identifying, in response to the name resolution request received by the reception unit, a virtual address corresponding to the name of the second device by reference to the third correspondence information, and transmits the identified virtual address to the first device.

5. A non-transitory computer-readable medium storing a program causing a computer to execute a process for virtual network connection, the process comprising:

executing address conversion of transmitted information between an information processor in a site and an information processor outside of the site by referring to a first storage unit that stores first correspondence information representing a correspondence relationship between a real address of an information processor in the site and a virtual address of the information processor in a virtual network;

acquiring second correspondence information representing a correspondence relationship between a name of an information processor in the site and a real address of the information processor from a second storage unit that stores the second correspondence information;

generating third correspondence information representing a correspondence relationship between a name of an information processor in the site and a virtual address of the information processor on the basis of the first correspondence information and the second correspondence information; and providing the third correspondence information to other sites in the virtual network by receiving, via the virtual network from a first information processor outside of the site, a name resolution request for requesting resolution of an address corresponding to a name of a second information processor in the site and identifying, in response to the name resolution request received, a virtual address corresponding to the name of the second information processor on the basis of the third correspondence information, and transmitting the identified virtual address to the first information processor.

6. The non-transitory computer-readable medium according to claim 5, wherein the providing the third correspondence information further comprises:

notifying other sites of forward setting information including a domain name of the site and a global IP address of the virtual network connection apparatus;

receiving, from other sites, forward setting information including a domain name of the other site and a global IP address of a virtual network connection apparatus of the other site, and storing the forward setting information in a forward setting storage unit;

when a domain name in a name included in a name resolution request from a third information processor in the site includes a domain name of another site included in the forward setting information stored in the forward setting storage unit, forwarding the name resolution request to a global IP address of the virtual network connection apparatus of the other site included in the forward setting information; and sending to the third information processor a virtual address returned from a virtual network connection apparatus of the other site in response to a name resolution request forwarded by the forwarding.

* * * * *